(12) United States Patent  
Ueda et al.

(10) Patent No.: US 7,965,471 B2  
(45) Date of Patent: Jun. 21, 2011

(54) METHODS FOR FORMING MICRO-TEXTURE ON AN AIR BEARING SURFACE OF A MAGNETIC READ/WRITE SLIDER AND A MAGNETIC READ/WRITE SLIDER WITH MICRO-TEXTURE

(75) Inventors: Kunihiro Ueda, HongKong (CN); HongTao Ma, DongGuan (CN); Hong Xin Fang, DongGuan (CN); Xiao Feng Qiao, DongGuan (CN); Heng Qiao, DongGuan (CN); Yong Zhu, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1688 days.

(21) Appl. No.: 11/218,710

(22) Filed: Sep. 6, 2005

(65) Prior Publication Data

US 2007/0050971 A1    Mar. 8, 2007

(51) Int. Cl.  
*G11B 5/60* (2006.01)  
*G11B 5/127* (2006.01)

(52) U.S. Cl. .................... 360/235.4; 29/603.12

(58) Field of Classification Search .............. None  
See application file for complete search history.

(56) References Cited

U.S. PATENT DOCUMENTS

| 6,359,754 | B1 * | 3/2002 | Riddering et al. | 360/236.6 |
| 6,459,260 | B1 * | 10/2002 | Bonin et al. | 324/158.1 |
| 6,583,953 | B1 * | 6/2003 | Han et al. | 360/122 |
| 2002/0054459 | A1 * | 5/2002 | Ishihara et al. | 360/313 |
| 2003/0184916 | A1 * | 10/2003 | Hanchi et al. | 360/236.5 |

FOREIGN PATENT DOCUMENTS

JP   61017280 A  *  1/1986  
JP   09265618 A  * 10/1997

* cited by examiner

*Primary Examiner* — David D Davis  
(74) *Attorney, Agent, or Firm* — Nixon & Vanderhye PC (57) ABSTRACT

A method for forming micro-texture on an air bearing surface of a magnetic read/write slider, includes: positioning sliders arranged in arrays on a tray, each slider having a pole tip facing upward; loading the tray into a processing chamber, which is then evacuated to a preset pressure; and introducing a processing gas containing oxygen into the processing chamber; exposing the sliders to etch the surface of the slider so as to form a clear two-step structure thereon.

15 Claims, 6 Drawing Sheets

METHODS FOR FORMING MICRO-TEXTURE ON AN AIR BEARING SURFACE OF A MAGNETIC READ/WRITE SLIDER AND A MAGNETIC READ/WRITE SLIDER WITH MICRO-TEXTURE

FIELD OF THE INVENTION

The present invention generally relates to magnetic read/write sliders for hard disk drives (HDDs) and its manufacturing method, and in particular to a method of forming micro-texture on air bearing surface (ABS) of the slider.

BACKGROUND OF THE INVENTION

Hard disk drives are booming with digital devices, such as digital cameras and audio/video devices and even television sets, which require a large amount of storage. Thus, there is a huge market demand for the HDDs, which drives the development of the HDDs in two aspects, namely high areal density and small physical volume.

The HDD comprises a plurality of disks each having a surface on which a magnetic coating is formed for recording digital data therein. A magnetic read/write slider is movable across the magnetic surface of the disk to access data stored therein. High areal density of record can be accomplished by either improving performance of the magnetic coating on the disk surface or reducing the size of the magnetic read/write slider that access data stored in the magnetic coating. Size reduction of the read/write slider means read/write signal is weaker and thus the magnetic track width and/or the magnetic track pitch can be decreased accordingly. However, the key aspects of decreasing the magnetic track width and/or track pitch is to improve the position control of the read/write slider, such as the flying height control, which represents the distance between the disk surface and the read/write slider when the slider is moving across the disk surface, also thickness of protective coating for both the magnetic slider and the disk surface, slider pole tip recession, and so on.

On the other hand, to minimize the physical volume of the HDD is a systematic engineering, which concerns not only changes in the physical dimension of parts of the HDD, but also re-optimization of flying dynamics performance of the slider. Currently used HDDs are 3.5" for desktop computers, and 2.5" for notebook computers. For applications in portable digital audio/video device, the size of the HDDs is down to 1" or even 0.85".

The magnetic read/write slider is the key component of the HDD. The magnetic read/write slider comprises a ceramic housing that controls the flying altitude or height of the slider. On a surface of the ceramic housing, patterns, such as "landing pad" and "flying rail" and negative pressure cavity, are formed by for example depositing and etching. The magnetic read/write slider also comprises functional layers arranged on the ceramic housing. The functional layers include transducers or magnetic pole tips, and read/write wire connecting pads or bonding pads.

The magnetic read/write slider has a very flat surface on the magnetic pole tip. The flat surface is conventionally formed by lapping the housing of the magnetic read/write slider with ultra-thin diamond slurry, having a nominal diameter of 50-100 nm. The very flat surface of the slider has a roughness, Ra, less than 0.3 nm. The lapping process also helps minimizing the pole tip recession.

For small-sized HDD, which is often referred to as micro-drive, the surface roughness for the slider housing must be increased, namely having a rougher housing surface, in order to improve performance of take-off and touch-down for the magnetic read/write slider. The slider housing is generally made of AlTiC, which is a mixture of $Al_2O_3$ (alumina) and TiC (titanium carbide), containing island-like TiC grains embedded in $Al_2O_3$ matrix.

U.S. Pat. Nos. 5,010,429 and 5,052,099 teach using sputtering process to form the rough surface for the slider housing. The target height, which is measured from top to bottom, of the roughness of the slider housing is about 50-300 angstrom, and the peak (protruded area) width and the peak-to-peak distance is about 5-20 micrometers. This is not good enough for micro-drive applications and the present invention is aimed to provide an improved micro-texture on the ABS of a magnetic read/write slider, which in turn improves the flying performance of the slider.

SUMMARY OF THE INVENTION

A main feature of the present invention is to provide a magnetic read/write slider of a disk drive with a micro-texture on its ABS, which has a small height to improve flying performance of the magnetic read/write slider.

Another feature of the present invention is to provide a method for forming the micro-texture, which can be implemented with sputtering or ion beam etching (IBE) in regular slider manufacturing process.

A further feature of the present invention is to provide a method for forming micro-texture without causing undesired electronic damage to the magnetic slider while maintaining volume production yield.

To achieve the above-mentioned objectives, in accordance with the present invention, a method for forming micro-texture on having a clear two-step structure comprises providing a slider having a lapped surface, applying etching operation with plasma or ion beam to the lapper surface in an atmosphere containing oxygen which enhances selectivity of an alumina base phase of the micro-texture over a second, particle-like titanium carbide phase so as to form the clear two-step structure of which a top step is defined by a top of the titanium carbide particles and a bottom step is defined by the alumina phase. The height of the top step from the bottom step is about 10 to 50 angstroms, and the distance between adjacent titanium carbide particles is about 0.2 to 3 micrometer.

Also provided is a magnetic read/write slider having an air bearing surface forming a micro-texture as described above. The slider has excellent takeoff and touch-down performance as compared to the conventional devices. Further, no electronic damage may occur on the magnetic read/write slider in making the micro-texture and volume production yield can be maintained.

The present invention will become more obvious from the following description when taken in connection with the accompanying drawings, which show, for purposes of illustration only, preferred embodiments in accordance with the present invention, and also demonstrate the best mode for carrying out the present invention. In the drawings:

DETAILED DESCRIPTION OF THE INVENTION

Figure 1A:
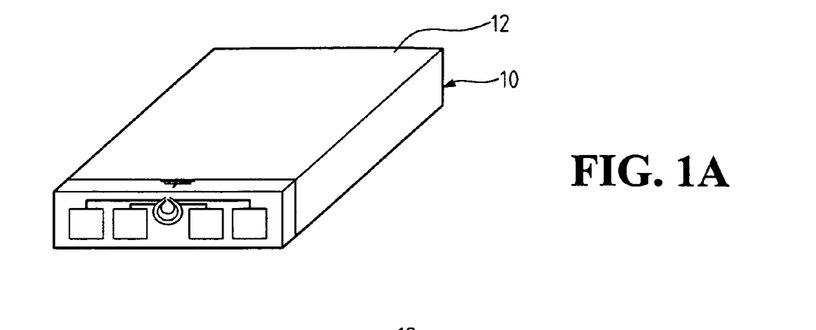
FIGS. 1A-1D schematically illustrate a process for making a magnetic read/write slider in accordance with the present invention.
Figure 1B:
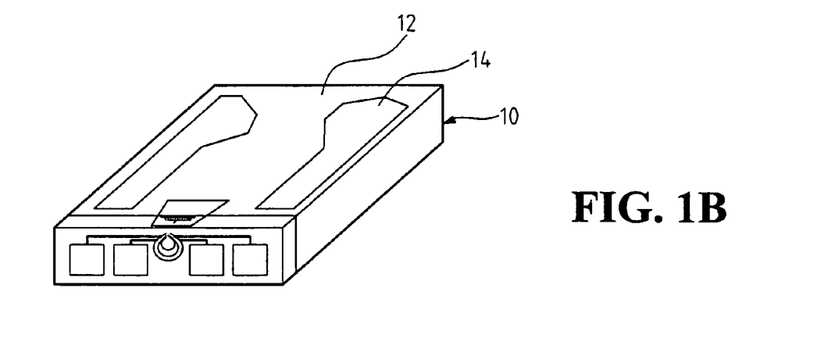
Figure 1C:
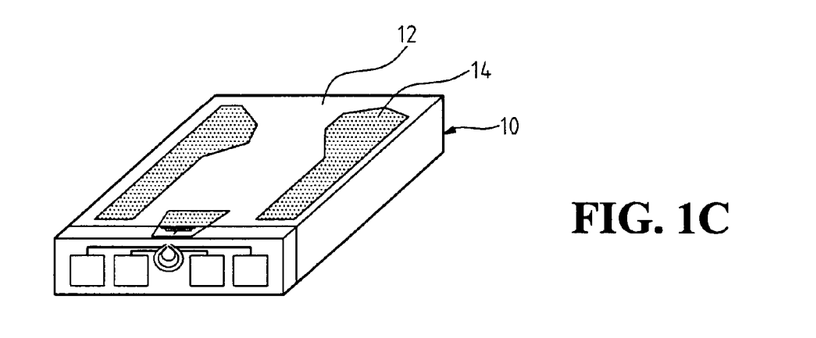

With reference to the drawings and in particular to FIGS. 1A-1D, which show a process for forming micro-texture on an air bearing surface (ABS) of a magnetic read/write slider, wherein the slider can be pico (30%) slider or femto (20%) slider, as mentioned previously, the magnetic read/write slider is movable across a surface of a rotating disk on which a layer of magnetic recording material is formed. The magnetic read/write slider has a surface, which functions as the ABS, facing the magnetic recording material for reading data from or writing data to the magnetic recording surface. As shown in FIG. 1A, the magnetic read/write slider, which is generally designated with reference numeral 10, has a surface 12 that is positionable above and faces the magnetic recording surface of a disk (both not shown). The surface 12 is processed to form the ABS by the following process.

Figure 1D:
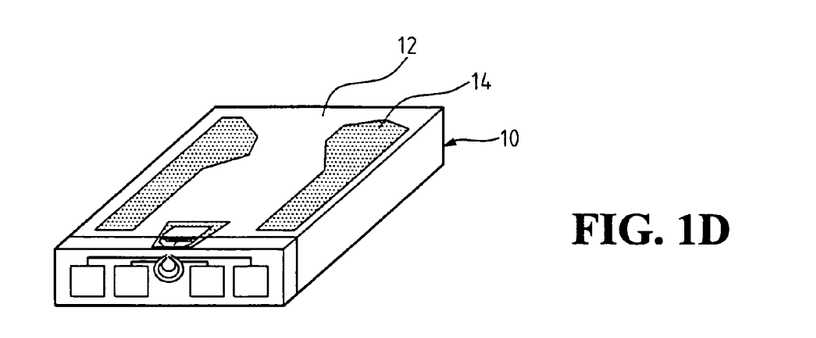

Firstly, the surface 12 is processed by fine lapping and becomes smooth with a surface roughness (Ra) of 0.2-0.4 nm, as shown in FIG. 1A. The lapped surface 12 is then covered with a protection layer, referred to as diamond-like carbon (DLC) layer. The surface 12 is then subject to a series of processing, including photolithography and ion etching, which forms recesses (or steps) 14 on the surface 12 for airflow and pressure control. Micro-texture, shown in hatch, is then formed on the surface 12, FIG. 1C, and a further processing is carried out to complete the ABS as shown in FIG. 1D.

Figure 2A:
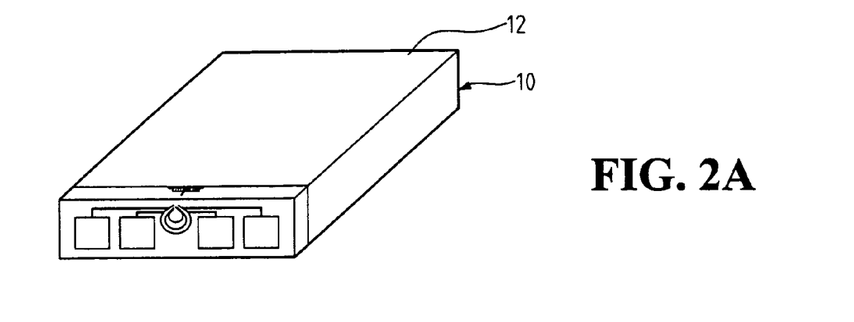
FIGS. 2A-2D schematically illustrate another process for making a magnetic read/write slider in accordance with the present invention.
Figure 2B:
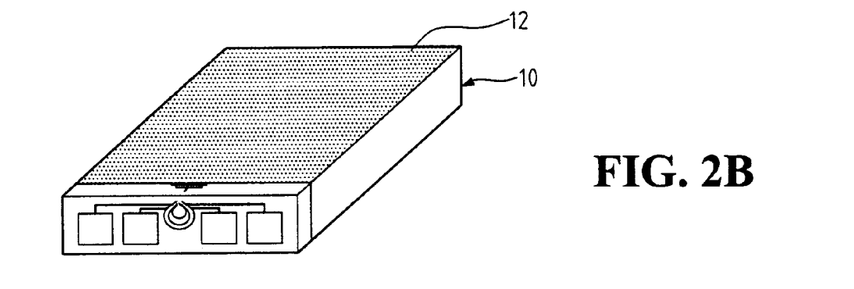
Figure 2C:
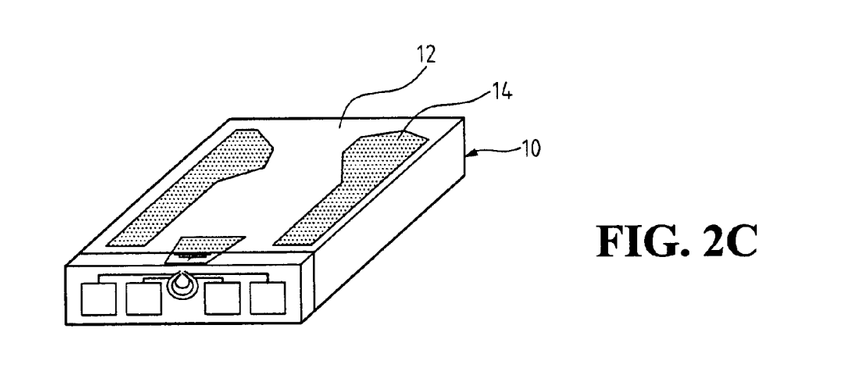
Figure 2D:
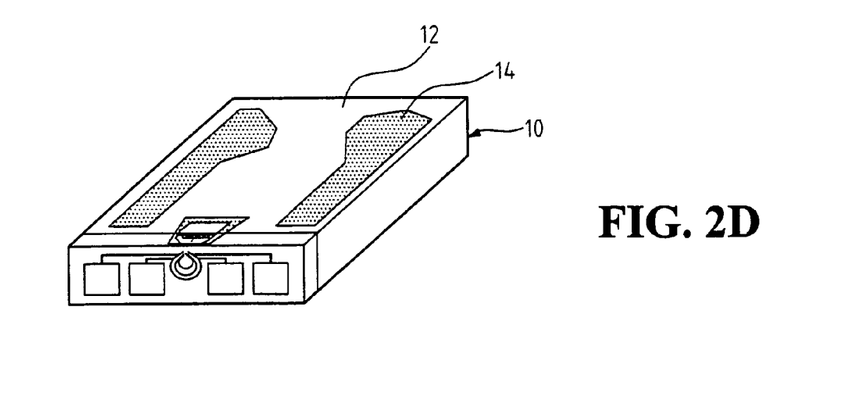

Alternatively, as shown in FIGS. 2A-2D, the surface 12 of the slider 10, after being lapped and coated with DLC layer (FIG. 2A) is processed to form micro-texture, shown in hatch in FIG. 2B. Thereafter, as shown in FIG. 2C, recesses (or steps) 14 are formed on the surface 12, and a further processing is carried out in FIG. 2D to complete the ABS.

Photo masks, including positive photo resist and negative photo resist, can be employed during the formation of the micro-texture to protect specific areas, such as magnetic pole tip, of the surface 12, whereby no micro-texture is formed on the specific areas.

Conventionally, chemical vapor deposition (CVD), ion beam deposition (IBD), and filtered cathodic arc (FCA) are employed to form an overcoat on the magnetic read/write slider. In common for theses process, three steps are involved in the formation of the overcoat, including pre-cleaning, adhesion layer coating, and diamond-like carbon (DLC) coating.

A slider to be processed is often cleaned in the atmosphere and is then loaded into a vacuum chamber, which is then evacuated. The surface of the slider to be processed normally absorb moisture, carbon dioxide, and even organic solvent that was used to clean the slider in atmosphere. In the pre-cleaning step, plasma etching or ion beam etching with noble gas, such as argon, which is preferred to such processing, is employed to remove the surface contamination from the slider to be processed. With the etching process, a very small amount of material is removed from the surface of the slider housing and no significant change of the surface roughness occurs. In other words, the surface roughness, Ra, of the slider still remains about 0.3 nm.

Once the pre-cleaning is done, an adhesion layer is coated on the processed surface of the slider. The adhesion layer is preferred to be formed with silicon, which helps growing DLC thereon. In addition, in the DLC coating step, methane or ethylene is used as precursor for CVD and IBD process, while pure graphite cylinder is used as FCA target.

The present invention is aimed to improve the pre-cleaning step in order to obtain a micro-texture on AlTiC substrate (including 64% $Al_2O_3$ and 36% TiC, referred as "slider housing") of the slider 10. This can be done with the original facility at the expense of a slight increase of process lead time, which makes the process of the present invention very practical. The present invention can be employed with several regular processes, including plasma etching process and ion beam etching, which will be separately described hereinafter.

Figure 3:
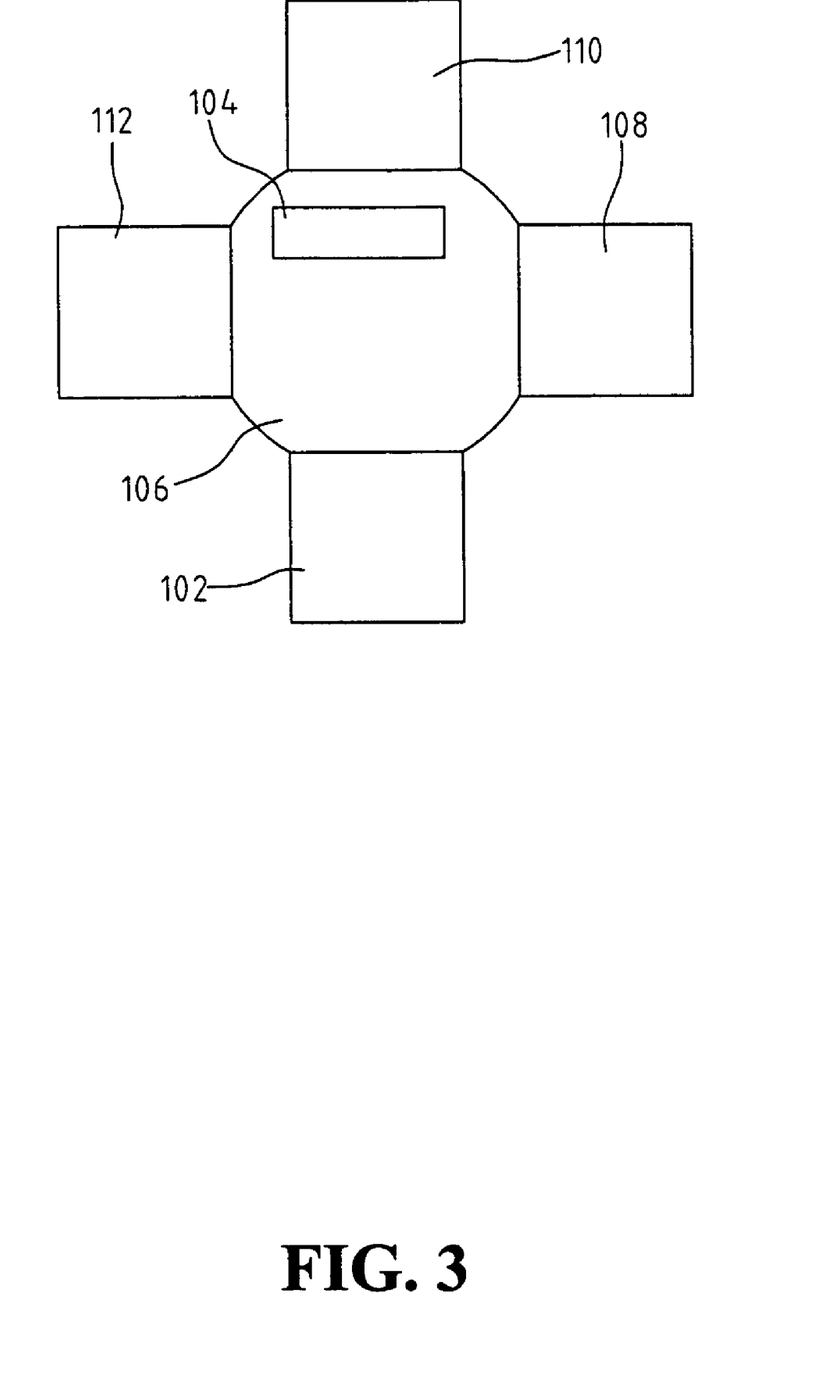
FIG. 3 schematically illustrates facility for performing plasma etching on a magnetic read/write slider to form the micro-texture in accordance with the present invention.

Referring to FIG. 3, which shows a facility for carrying out plasma etching process for forming micro-texture on the slider housing, a plurality of magnetic sliders, which are arranged in arrays, also referred to as row bars, are fixed in a carried tray and the tray is loaded into the facility through a loading/unloading port 102. In the invention, a robot system 104 is used to move the tray from the loading/unloading port 102 to a vacuum transfer chamber 106 of the facility. Thereafter, the vacuum transfer chamber 106 is pumped down to a preset pressure and then the tray is moved into a plasma etching chamber 108.

To start the plasma etching process, the plasma etching chamber 108, with the tray received therein, is pumped down to a preset pressure, and a processing gas, such as oxygen or an oxygen-noble gas mixture, is introduced into the plasma etching chamber 108 via a mass flow controller (MFC) valve (not shown). After the introduction of the process gas, plasma is ignited. Several ways can be used to generate plasma. The most widely used is directly capacitance coupled plasma and inductive coupled plasma using a radio frequency power. However, some newly developed methods can use electro-cyclotron resonance enhanced micro-wave source to generate plasma. In the present invention, the key point for forming the micro-texture is to adjust substrate bias. The capacitance coupled plasma has a self bias on the substrate, but for the other methods, an additional power must be applied to the substrate to provide the substrate bias.

The plasma is set off after the elapse of a preset time period. The setting of time is dependent upon a desired height of the micro-texture formed on the slider.

Thereafter, the tray is moved by the robot system 104 to a silicon coating chamber 110 in which a layer of silicon is sputter-coated on the surface of the slider housing. The tray is then transferred, also by the robot system 104, to an a-C:H/ta-C (amorphous carbon with hydrogen/tetrahedral carbon) coating chamber 112 in which a layer of DLC is deposited on the surface of the slider housing to a desired thickness.

Critical factors that affect the plasma etching process include type of process gas, pressure of process chamber, etching power and etching time. The process gas used in the plasma etching process in accordance with the present invention to get a bigger selectivity of $Al_2O_3$ to TiC is oxygen, argon, or a mixture of oxygen and noble gas(s). In the invention, oxygen has a faster etching rate for $Al_2O_3$ and a slower rate for TiC. Flow rate of the process gas is controlled by the MFC to reach to a desired pressure, where the pressure of the process chamber is set to 1.0 Pa for the operation of the process.

Electrical power required for carrying out the present inventive process is adjusted in accordance with the facility configuration to generate plasma in the plasma etching process and to provide a bias on the slider to be processed. In an embodiment of the present invention, a bias of 300V DC is applied t the slider. The purpose of the bias is to make physical etching of oxygen dominant.

Etching time is set in accordance with the desired step height of the micro-texture. Normally, for micro-texture having a step height of about 4 nm, the etching time is set to about five minutes.

As a modification of the above described process, an additional step is included for processing sliders that have already had ABS pattern thereon to modify the original ABS pattern. The additional step is carried out after the slider is loaded into the plasma etching chamber 108 and the plasma etching chamber 108 is evacuated. Plasma is ignited in the evacuated etching chamber 108 to etch away the overcoat, including the silicon layer and the carbon (diamond) layer, that originally exists on the slider. And thereafter, without breaking the evacuated condition inside the etching chamber 108, the process gas that is discussed above is introduced into the etching chamber 108 and plasma etching is performed again with the process gas. Again, the desired micro-texture is formed on the slider, which is then subject to coating of silicon and growth of DLC.

Figure 4:
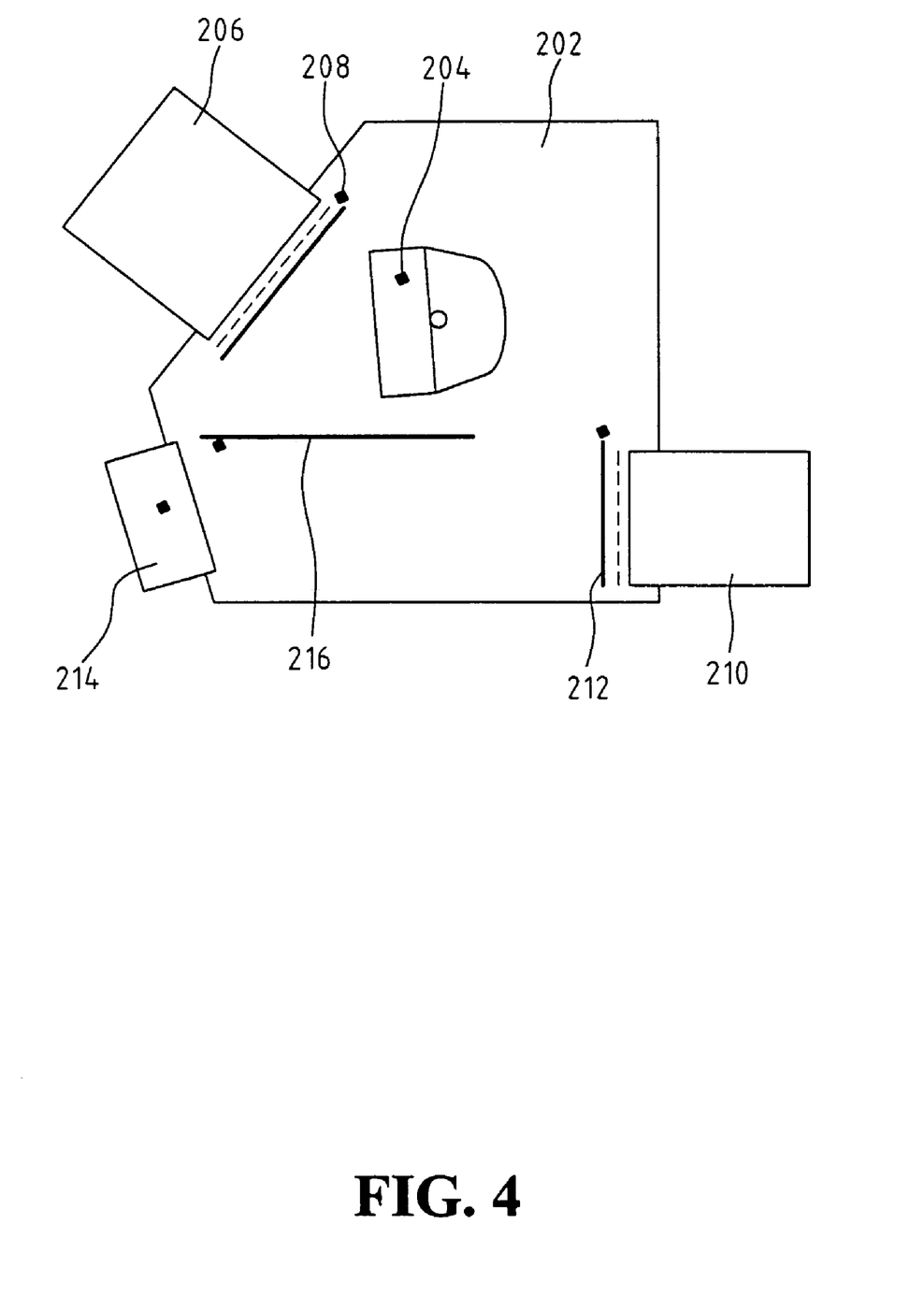
FIG. 4 schematically illustrates facility for performing ion beam etching on a magnetic read/write slider to form the micro-texture in accordance with the present invention.

Another example of the present invention includes the use of ion beam etching (IBE) to replace the plasma etching that is discussed above. The facility for carrying out the IBE process is shown in FIG. 4. The process for forming micro-texture on the slider with ion beam etching starts from loading a tray that carries a plurality of magnetic sliders, which are arranged in arrays, into a vacuum process chamber 202 and fixing the tray with a product holder 204, which is operable to tilt between 0-90 degrees. The chamber 202 is then pumped down to a preset pressure.

After that, process gas, such as oxygen or a mixture of oxygen and noble gas, is introduced into a first ion source 206, which is separated from the product holder 204 by a first shutter 208. Then, neutralizer and plasma inside the ion source 206 is ignited. After a certain period after the ignition, the plasma gets stable.

Once the plasma becomes stable, the product holder 204 is tilted to a preset angle and the shutter 208 is opened to allow the plasma to bombard the sliders fixed on the tray for carrying out pre-cleaning operation for the sliders. Internal pressure inside the process chamber at this moment is about 0.03-0.05 Pa.

After a given period of time elapse from the opening of the shutter 208, the shutter 208 is closed again and power to the ion source 206 and the neutralizer is shut down. The process chamber 202 is once again evacuated and the tray tilted to another preset direction and processed by a combination of a second ion source 210, which is shuttered by a second shutter 212 and a silicon target 214 that is shielded from the product holder 204 by a third shutter 216. A silicon layer is thus formed on the sliders.

Thereafter, the tray is tilted back to the first ion source 206. However, the source gas for the first ion source 206 is changed to $C_2H_4$ for forming a C:H coating. The processing time of this phase is determined by the desired thickness of the C:H coating and the deposition rate of layer.

Critical factors that affect the micro-texture forming by ion beam etching include: type of process gas, incidence angle of ion beam, etching power and etching time. The process gas used in the ion beam etching process in accordance with the present invention for getting a bigger selectivity of $Al_2O_3$ to TiC is oxygen, argon, or a mixture of oxygen and noble gas(s). Adjusting ion beam incidence angle is needed when the pole tip recess of the magnetic slider is a concern. Pole tip material and surface morphology before pre-cleaning is a main concern to adjust the incidence angle to meet the desired pole tip morphology.

Etching power can also be adjusted by grids voltage which can form an accelerating electric field, and radio-frequency (RF) power that can adjust the ionization ratio in ion source. Optimum etching power is determined by the requirement of etching volume, processing time, plasma stability, and electrical static charge damaging. Etching time is dependent on the desired height of micro-texture and previous power angle setting.

Figure 5:
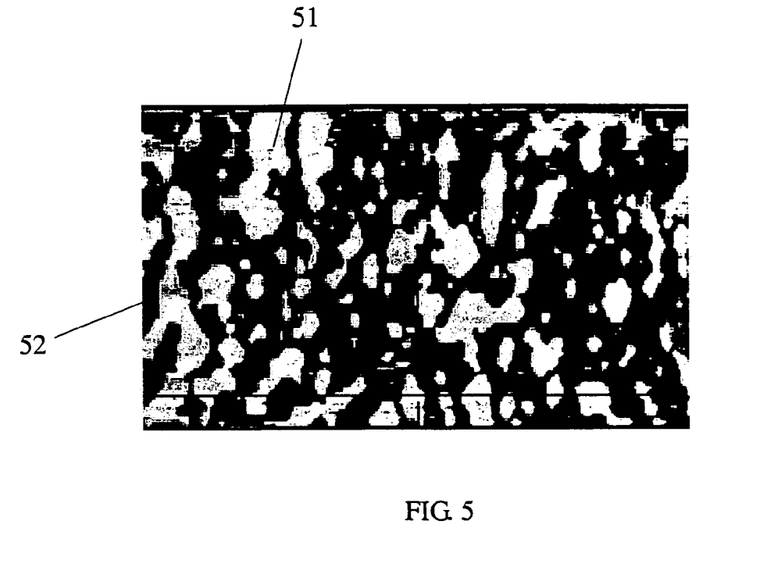
FIG. 5 is a morphology of AlTiC surface with micro-texture of the slider.

In the present invention, referring to FIG. 5, the AlTiC surface, after being so processed, forms a micro-texture having a clear two-step structure, including a top step of TiC 51 and a bottom step of alumina 52. The height of the micro-texture can be measured by atomic force microscope (AFM), wherein a 20 micrometer square area is scanned, and the flatten method is used to get rid of the effect of cantilever bow of the atomic force microscope.

Figure 5A:
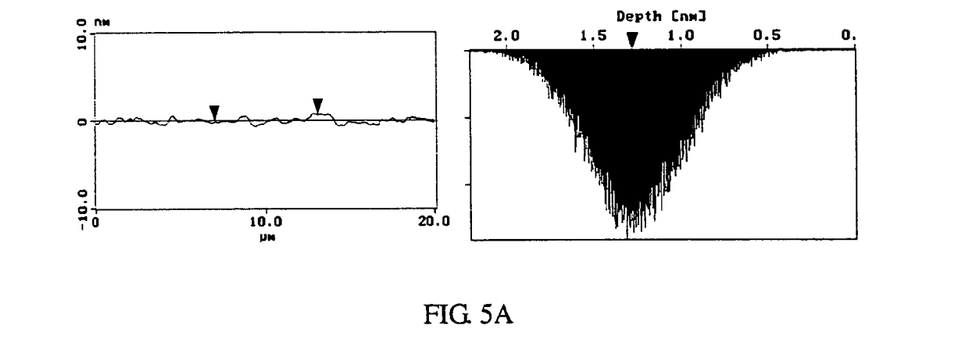
FIGS. 5A-5E respectively show the micro-texture of the slider at different status according to the present invention.
Figure 5B:
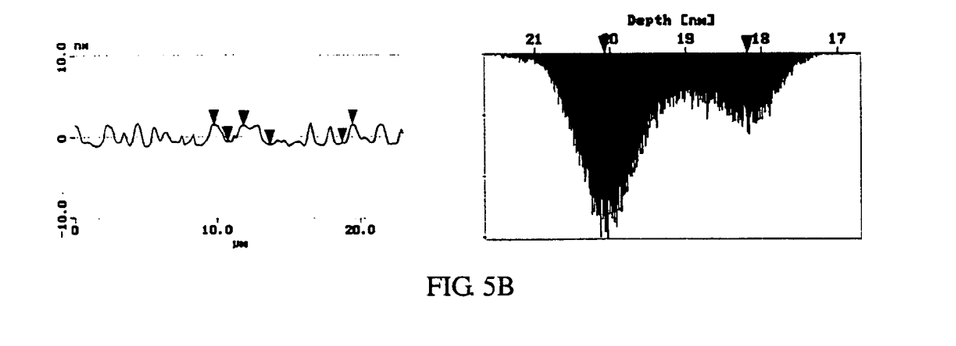
Figure 5C:
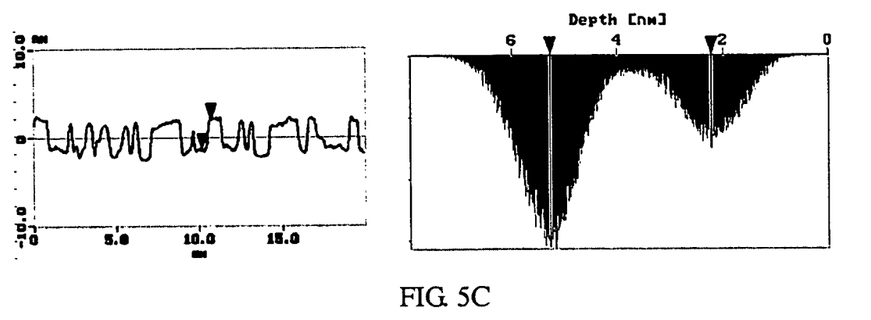
Figure 5D:
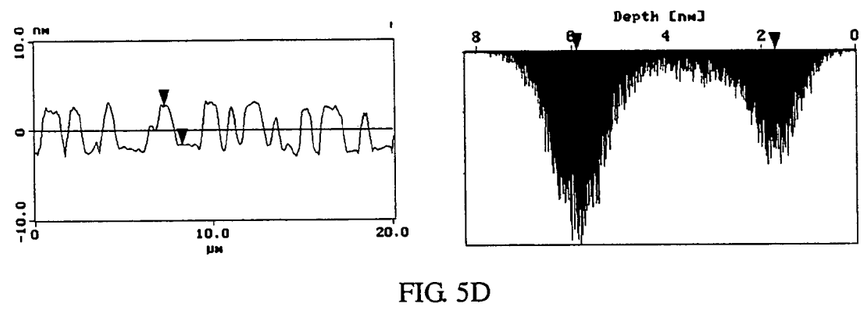

Referring to FIG. 5A, Without the process in accordance with the present invention, no clear two-step structure is formed on the AlTiC surface. This is because after lapping, mechanical removal of the two hard substances, alumina and titanium carbide, has similar removal rate. The conventional process using argon gas to remove the surface contamination has very small selectivity for removing alumina over titanium carbide. The process of the present invention provides the micro-texture with a clear two-step structure, which clearly shows the difference between the two substances in height. The step height or the micro-texture height is dependent upon the processing time. With 20 second processing, the micro-texture reaches a step height of 2 nm, see FIG. 5B, and 40 second processing, the micro-texture reaches a step height of 3 nm, see FIG. 5C, and for 60 second processing, the micro-texture reaches a step height of 4 nm, see FIG. 5D.

The height of the micro-texture affects the touch-down and take-off performance of the slider. This is clearly observed from the following table.

| Item | micro-texture height (nm) | touch down (atm.)* | take off (atm.)** |
|---|---|---|---|
| 1 | <1 | 0.60 | 1.00 |
| 2 | 2 | 0.55 | 0.66 |
| 3 | 3 | 0.58 | 0.69 |
| 4 | 4 | 0.57 | 0.72 |

*touch down (atm.): the maximum pressure at which the slider can touch magnetic disk.
**take off (atm.): the minimum pressure at which the slider can take off from the magnetic disk.
Lower volume and difference between touch down and take off shows better stability for applications.

Figure 5E:
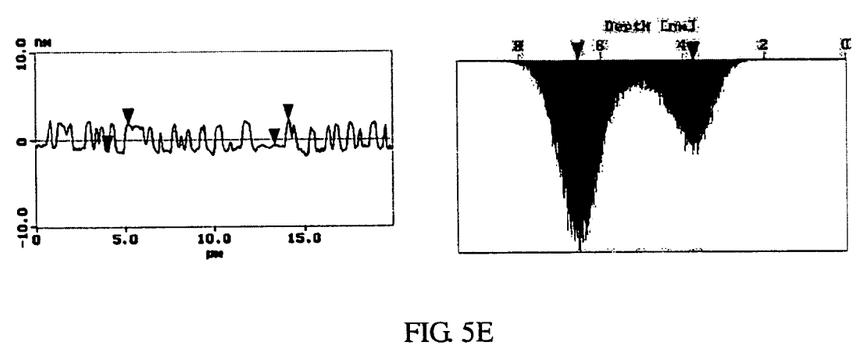

In the present invention, the substrate is not limited to AlTiC as discussed above, a mixture of two kind of material: 64% $Al_2O_3$[alumina] and 36% TiC[titanium carbide]. Here, $Al_2O_3$ act as a ground substance, while TiC acts as an island-like second phase. The grain size of the AlTiC substrate is around 1 micron. When the grain size of the AlTiC substrate is changed, the micro-texture process of the invention can still get a similar result, only the density of island-like second phase has some difference, as shown in FIG. 5E.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for forming a micro-texture on an air bearing surface of a magnetic read/write slider, the method comprising:
   (a) positioning sliders arranged in arrays on a tray, each slider having a pole tip facing upward;
   (b) loading the tray into a processing chamber, which is then evacuated to a preset pressure;
   (c) introducing a processing gas containing oxygen into the processing chamber;
   (d) exposing the sliders to an etching means in the atmosphere of the processing gas to etch the surface of the slider so as to form the micro-texture composed of a plurality of clear two-step structures, wherein the step of the two-step structure has a height ranging from 10 to 50 angstroms and a distance between adjacent steps ranging from 0.2 to 3 micrometers.

2. The method as claimed in claim 1 further comprising lapping the surface of the slider before (a).

3. The method as claimed in claim 1 further comprising shielding the pole tip with a photo-resist mask before (c).

4. The method as claimed in claim 3, wherein the photo-resist mask is a positive photo resist or a negative photo resist.

5. The method as claimed in claim 3, wherein the photo-resist mask has a thickness in the range between 1-20 micrometers.

6. The method as claimed in claim 1, wherein the surface has a roughness of 0.2-0.4 nm after lapping.

7. The method as claimed in claim 1, further comprising forming an ABS pattern on the surface before (a), and removing an overcoat layer thereon after (b).

8. The method as claimed in claim 1, wherein the etching means comprises plasma or ion beam.

9. The method as claimed in claim 8, wherein the plasma is directly capacitance coupled plasma or inductive coupled plasma.

10. The method as claimed in claim 8, wherein the plasma is generated by an electro-cyclotron resonance enhanced micro-wave source.

11. The method as claimed in claim 1, wherein the processing gas is pure oxygen.

12. The method as claimed in claim 1, wherein the processing gas is a mixture of oxygen and at least one noble gas.

13. A method for forming a magnetic read/write slider with a micro-texture, the method comprising:
    (a) positioning sliders arranged in arrays on a tray, each slider having a pole tip facing upward;
    (b) loading the tray into a processing chamber, which is then evacuated to a preset pressure;
    (c) introducing a processing gas containing oxygen into the processing chamber;
    (d) exposing the sliders to an etching means in the atmosphere of the processing gas to etch the surface of the slider so as to form the micro-texture with a plurality of clear two-step structures, wherein the step of the two-step structure has a height ranging from 10 to 50 angstroms and a distance between adjacent steps ranging from 0.2 to 3 micrometers;
    (e) forming a silicon coating on the etched surface; and
    (f) forming a diamond-like carbon layer on the silicon coating.

14. The method as claimed in claim 1, wherein the two-step structure includes a top step of titanium carbide and a bottom step of alumina.

15. The method as claimed in claim 13, wherein the two-step structure includes a top step of titanium carbide and a bottom step of alumina.

* * * * *